(12) United States Patent
Manssour (10) Patent No.: US 9,154,250 B2
(45) Date of Patent: Oct. 6, 2015

(54) RADIO NETWORK NODE AND A METHOD THEREIN

(75) Inventor: Jawad Manssour, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 107 days.

(21) Appl. No.: 13/985,684

(22) PCT Filed: Feb. 16, 2011

(86) PCT No.: PCT/SE2011/050168
§ 371 (c)(1),
(2), (4) Date: Aug. 15, 2013

(87) PCT Pub. No.: WO2012/112088
PCT Pub. Date: Aug. 23, 2012

(65) Prior Publication Data
US 2013/0322303 A1 Dec. 5, 2013

(51) Int. Cl.
*H04B 3/36* (2006.01)
*H04J 3/16* (2006.01)
*H04W 88/04* (2009.01)

(52) U.S. Cl.
CPC ............. *H04J 3/1694* (2013.01); *H04W 88/04* (2013.01)

(58) Field of Classification Search
CPC .... H04J 3/1694; H04W 88/04; H04B 7/2606; H04B 3/36; H04B 7/15542; H04B 2001/7154; H04L 12/10
USPC ......... 370/274, 279, 293, 315–327, 492, 501; 178/70; 330/61; 375/211; 379/338; 455/7
See application file for complete search history.

(56) References Cited

U.S. PATENT DOCUMENTS

2010/0142417 A1* 6/2010 Kim et al. ...................... 370/281
2011/0194632 A1* 8/2011 Clerckx et al. ................ 375/260
2012/0320819 A1* 12/2012 Kim et al. ...................... 370/315

FOREIGN PATENT DOCUMENTS

WO WO 2009/149565 A1 12/2009
WO WO 2010/107230 A2 9/2010
WO WO 2010/148319 A1 12/2010

OTHER PUBLICATIONS

International Search Report, PCT/SE2011/050168, Sep. 22, 2011.
Written Opinion of the International Searching Authority, PCT/SE2011/050168, Sep. 22, 2011.
Written Opinion of the International Preliminary Examining Authority, PCT/SE2011/050168, Feb. 20, 2013.
International Preliminary Report on Patentability, PCT/SE2011/050168, May 13, 2013.

* cited by examiner

*Primary Examiner* — Mang Yeung
(74) *Attorney, Agent, or Firm* — Myers Bigel Sibley & Sajovec, P.A.

(57) ABSTRACT

A method in a radio network node for communicating with a user equipment (UE) during communication between the radio network node and a radio base station in a radio communications network. The radio network node serves the UE within a cell and communicates with the radio base station and the UE over a frequency spectrum in a time division duplexing configuration. The radio network node sets up a first connection over a first part of the frequency spectrum to the radio base station, and a second connection to the UE over the first or a second part of the frequency spectrum. The second part of the frequency spectrum is solely used for communication with UEs within the cell. The radio network node then communicates simultaneously with the UE and the radio base station over respective connections in a time slot of a reference time configured by the radio communications network.

15 Claims, 6 Drawing Sheets

RADIO NETWORK NODE AND A METHOD THEREIN

CROSS REFERENCE TO RELATED APPLICATION

This application is a 35 U.S.C. §371 national stage application of PCT International Application No. PCT/SE2011/050168, filed on 16 Feb. 2011, the disclosure and content of which is incorporated by reference herein in its entirety. The above-referenced PCT International Application was published in the English language as International Publication No. WO 2012/112088 A1 on 23 Aug. 2012.

TECHNICAL FIELD

Embodiments herein relate to a radio network node and a method therein. In particular, embodiments herein relate to a communication to a user equipment during a communication between the radio network node and a radio base station.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few.

3GPP Long Term Evolution (LTE) is a project within the 3rd Generation Partnership Project (3GPP) to evolve the WCDMA standard towards the fourth generation of mobile telecommunication networks. In comparisons with WCDMA, LTE provides increased capacity, much higher data peak rates and significantly improved latency numbers. For example, the LTE specifications support downlink data peak rates up to 300 Mbps, uplink data peak rates of up to 75 Mbps and radio access network round-trip times of less than 10 ms. In addition, LTE supports scalable carrier bandwidths from 20 MHz down to 1.4 MHz and supports both Frequency Division Duplex (FDD) and Time Division Duplex (TDD).

Furthermore, the latest release, also referred to as release 10, of LTE is 3GPP's candidate for International Mobile Telecommunications—Advanced (IMT-A) technology which is expected to provide among other things, peak rates as high as 1 Gbps in downlink (DL), and several hundreds of Mbps in uplink (UL). One of the major additions to LTE Release 10 from the initial LTE release, i.e. release 8, is the concept of relaying.

In all simplicity, the concept of relaying consists of deploying a radio network node, also referred to as a Relay Node (RN), in a cell of the radio communications network in order to provide radio coverage in black spots in the cell or beyond the cell and also possibly increase the capacity in already radio covered spots. The relaying concept may comprise only one relay node in the cell but is more likely to comprise multiple relay nodes per cell. Thus, the relay node forwards data in the uplink to a radio base station or to a different relay node, or forwards data to a user equipment or to a different relay node in the downlink.

The connection between the radio base station and the relay node is referred to as the backhaul link over an air interface denoted as Un. It is on the backhaul link that communication between radio base station and relay node takes place. The connection with the user equipment within the cell, whether from the radio base station or the relay node, is known as the access link over an air interface denoted as Uu.

In order to coordinate transmissions, Un and Uu share the frequency bandwidth, whether in uplink or in downlink by strict time division multiplexing (TDM). Strict TDM means that in case a Un link is configured, the relay node cannot have any Uu links configured. Based on a configuration of a certain slot, i.e. whether backhaul link or access link, and based whether it is an UL or DL phase, some nodes will transmit whereas others will listen.

Using multiple relay nodes in a cell enhances the performance of the user equipments traditionally having low Signal to Interference plus Noise Ratios (SINR) in the radio communications network. However, such gains of performance have been curbed by some major limitations in the achievable high rates in LTE release 10. It has been detected that mainly cell edge users and user equipments having bad radio conditions gain from the concept of relaying. Although relaying is able to enhance the performance of user equipments in bad radio conditions, it creates a problem for user equipments with already high SINR, leading to limiting the peak rates by e.g. 50% when the resource allocation is divided equal between the access link and the backhaul link.

SUMMARY

An object with embodiments herein is to improve the performance of transmission within a radio communications network.

The object is achieved by a method in a radio network node for communicating with a user equipment during a communication between the radio network node and a radio base station in a radio communications network. The radio network node, the radio base station, and the user equipment are comprised in the radio communications network. The radio network node serves the user equipment within a cell and is configured to communicate with the radio base station and the user equipment over a frequency spectrum in a time division duplexing configuration. The radio network node sets up a first connection over a first part of the frequency spectrum to the radio base station, and a second connection to the user equipment over the first or a second part of the frequency spectrum. The second part of the frequency spectrum is solely used for communication with user equipments within the cell. The radio network node communicates simultaneously with the user equipment and the radio base station over respective connection in a time slot of a reference time configured by the radio communications network. Thus, the radio network node uses a same time slot for communicating with the radio base station and the user equipment.

In order to perform the method a radio network node for communicating with a user equipment during a communication between the radio network node and the radio base station in the radio communications network is provided. The radio network node is arranged to serve the user equipment within a cell and to communicate with the radio base station and the user equipment over a frequency spectrum in a time division duplexing configuration. The radio network node comprises a connection circuit configured to set up a first connection to the radio network node over a first part of the frequency spectrum. The connection circuit is further configured to set up a second connection over the first or a second part of the frequency spectrum. The second part of the frequency spectrum is solely used for communication with user equipments within the cell of the radio network node. Furthermore, the radio network node comprises a communication circuit configured to communicate simultaneously with the user equipment and the radio base station over respective connection in a time slot of a reference time configured by the radio communications network.

Embodiments herein alleviate, and ideally completely remove the limitation of peak rates and increase the throughput, by providing a radio network node that communicates simultaneously with the user equipment and the radio base station. Embodiments herein relate to a method of utilizing the typically unutilized portions of the frequency spectrum at the radio network node when a backhaul link is configured. This is done through allowing simultaneous UL and DL transmissions on carefully selected portions of the spectrum at the radio network node when a backhaul link is configured. The method may significantly alleviate the problem of peak rate limitation and increase the throughput for user equipments connected to the radio network node. It should be understood that the radio network node may also be referred to as the relay node.

BRIEF DESCRIPTION OF THE DRAWINGS

Embodiments will now be described in more detail in relation to the enclosed drawings, in which.

DETAILED DESCRIPTION

Figure 1:
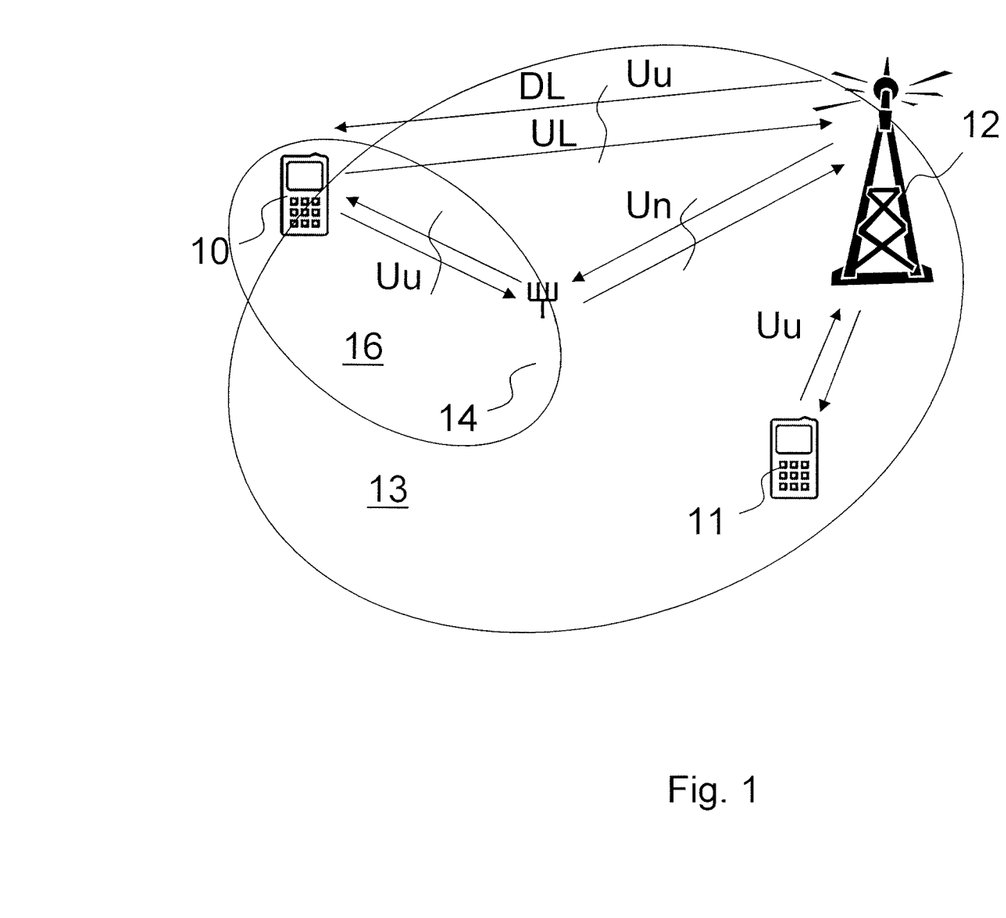
FIG. 1 is a block diagram depicting a radio communications network.

FIG. 1 provides a general overview of a radio communications network. The radio communications network may be a network according to a standard, such as a Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention some few arbitrary possible options.

The radio communications network comprises a first user equipment (UE) 10, a second user equipment (UE) 11 and a radio base station 12. The first and second user equipments 10,11 are served in a macro cell 13 controlled by the radio base station 12 and are transmitting data and communicating over a radio link with the radio base station 12, which communication is a so called uplink (UL) transmission. The radio base station 12 is transmitting data and communicating with the first and second user equipments 10,11 in a so called downlink (DL) transmission. In addition, a radio network node, also referred to as a relay node 14, is comprised in the radio communications network. A relay node 14 is a radio network node that forwards data in the uplink to the radio base station 12 or to a different relay node, or forwards data to the first user equipment 10 or to a different relay node in the downlink transmission.

The first user equipment 10 has in the illustrated example a poor channel condition towards the radio base station 12. For example, the first user equipment 10 may be outside a radio coverage of the macro cell 13 of the radio base station 12 or in a radio coverage hole. However, the relay node 14 provides a radio coverage over a geographic area, also called a relay cell 16, covering the first user equipment 10. Thus, the first user equipment 10 is served in the relay cell 16.

During the DL transmission in a relaying operation, and in case a Un-link is configured, the radio base station 12 transmits information to the user equipment 10,11. A part of the information is directed to the second user equipment 11, e.g. user equipments connected directly to the radio base station 12 and not to the relay node 14, and another part is directed to the relay node 14, e.g. this other part of information is forwarded from the relay node 14 to the first user equipment 10 that has a bad channel condition towards the radio base station 12. Although relaying is expected to introduce gains for the first user equipment 10 being in poor channel conditions of the macro cell 13, the allocation and sharing of resources between a backhaul link, denoted Un, and an access link, denoted Uu, is considered to be an important area as it has consequences on the capacity performance of the radio communications network. This resource allocation and resource sharing may cause significant limitations to achievable peak rates and throughput.

The radio communications network is configured to communicate according to a time division duplexing manner. Time division duplexing applies time multiplexing to separate transmission and reception. Communication is organized in radio frames comprising subframes. The subframes are organized in time slots, in which time slots transmissions are performed either in one direction or another direction. Strict time multiplexing between the backhaul and access links may adversely affect the performance of the second user equipment 11 with good channel conditions towards the radio base station 12. This is because the number of transmission opportunities of this second user equipment 11 would decrease due to the time sharing of the channel. The first user equipment 10 with the poor channel quality will benefit by having a better 'equivalent' channel due to relaying, but the second user equipment 11 with the good channel quality will suffer from less accessibility to the channel.

Such a limitation may be overcome through a radio resource management performed in the relay node 14 according to embodiments herein.

According to embodiments herein the relay node 14 operates over a frequency spectrum and sets up a first connection to the radio base station 12 over a first part of the frequency spectrum. The relay node 14 then sets up a second connection over the first or a second part of the frequency spectrum to the first user equipment 10. The second part of the frequency spectrum is solely used for communication within the relay cell 16. The relay node 14 then communicates simultaneously with the first user equipment 10 and the radio base station 12 over respective connection in a time slot of a reference time configured by the radio communications network.

In some embodiments, the relay node 14 may determine that the radio base station 12 supports DL transmissions over a plurality of layers towards the relay node 14 but is only going to use some of the plurality of layers. This may be determined by comparing a configuration of the first connection with a rank indicator that the relay node 14 may report to the radio base station 12 since the radio base station 12 may use the rank indicator information to decide on the number of layers. Also, the relay node 14 may identify that the first user equipment 10 supports UL transmissions also over a plurality of layers towards the relay node 14. The relay node 14 may then decide that the first user equipment 10 may be scheduled for UL transmissions at or in a same time slot as DL transmissions from the radio base station 12, also referred to as simultaneously communicating with the radio base station 12 and the first user equipment 10. For example, if the relay node 14 comprises two antennas operating over the first part of the frequency spectrum, the relay node 14 may receive at one of the antennas a DL transmission transmitted at a time slot related to the macro cell 13 from the radio base station 12. The relay node 14 may also receive at the other one of the antennas an UL transmission from the first user equipment 10 transmitted at the same corresponding time slot of the macro cell 13. Thus, the rate and throughput in the uplink within the macro cell 13 for the first user equipment 10 may be increased as the time slot related to the radio base station 12 now is shared between DL over Un and UL over Uu. Similarly, a time slot for UL transmission from the relay node 14 over Un may be shared with a DL transmission from the relay node 14 over Uu. The UL and DL transmissions, to and from the relay node 14, use non-overlapping resource blocks during the very same transmission time interval (TTI). Embodiments herein preserve the gains for cell edge users while simultaneously avoiding any losses in the peak rates and spectral efficiency, hence increasing both achievable peak rates and cell and user throughput.

Figure 2:
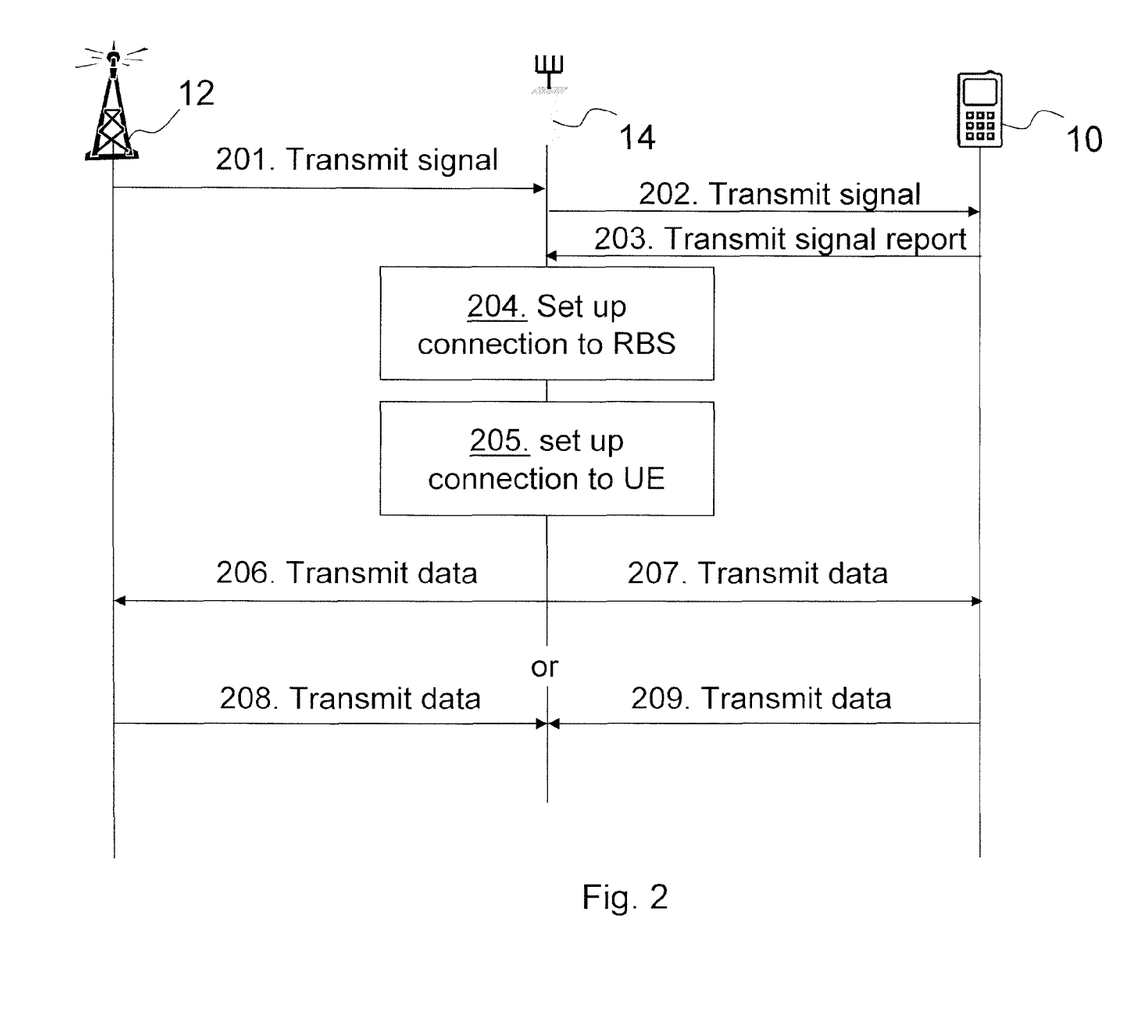
FIG. 2 is a schematic combined flowchart and signalling scheme in a radio communications network.

FIG. 2 is a schematic combined flowchart and signaling scheme. The relay node 14 is to communicate with the radio base station 12 and the first user equipment 10 over a frequency spectrum, also referred to as inband relaying. Inband relaying means that the same frequency spectrum is used on the backhaul link as that used on the access link.

Step 201. The radio base station 12 may transmit a signal to the relay node 14, which signal may comprise a first reference signal pattern and may further indicate configuration of the first connection to the radio base station 12. Such a configuration may comprise indication of frequency used and similar.

Step 202. The relay node 14 in its turn may transmit over the second connection, a second reference signal pattern in a signal to the first user equipment 10.

Step 203. The first user equipment 10 may transmit back to the relay node 14 a measurement report of a channel quality of the second connection. The measurement report is based on measurement on the received second reference signal pattern and may comprise a Channel State Information (CSI). The CSI may comprise Channel Quality Indicator (CQI), a Pre-coding Matrix Indicator (PMI), a Rank Indicator (RI) and/or similar. The CQI provides feedback to the relay node 14 about link adaptation parameters that the first user equipment 10 may support at the time taking into account the transmission mode, the receiver type, number of receiver antennas, and interference situation. PMI provides information about a preferred pre-coding matrix in a codebook based pre-coding and is only relevant for multi-layer communication and the number of pre-coding matrices in a codebook depends on the number of relay node antenna ports. RI is a recommendation from the first user equipment for a number of layers or streams to be used in transmission.

Step 204. The relay node 14 then sets up the first connection to the radio base station 12 over a first part of the frequency spectrum. For example, the relay node may transmit a measurement report back to the radio base station 12. The radio base station 12 uses the measurement report to schedule transmission or reception, to or from the relay node 14, at a time slot of the radio communications network.

Step 205. The relay node 14 sets up the second connection over the first or the second part of the frequency spectrum allowing the radio network node 14 to communicate simultaneously with the first user equipment 10 and the radio base station 12. The second part of the frequency spectrum is solely used for communication with user equipments within the relay cell 16 of the relay node 14.

Step 206. The relay node 14 may then transmit data to the radio base station 12 in a time slot of a reference time configured by the radio communications network.

Step 207. The relay node 14 may simultaneously transmit data to the first user equipment 10 in the same time slot.

Step 208. Additionally or alternatively, the radio base station 12 may transmit data to the relay node 14 in another time slot of the reference time configured by the radio communications network.

Step 209. The first user equipment 10 may simultaneously with the radio base station 12 transmit data to the relay node 14 in the other time slot.

As the channel quality is typically good on the backhaul link, and since the user equipments in the relay cell 16 are typically close to the relay node 14, there will be many user equipments that satisfy the condition to apply the proposed method. Due to the good channel quality, the user equipment transmission in the UL may be separated from the DL transmission coming from the radio base station 12 and that occurs on the same frequency resources. For example, although an UL transmission will typically have a lower transmit power compared to a DL transmission, the UL transmission should be received with good quality at the relay node 14 and will not be seen as noise compared to the DL transmission from the radio base station 12. One specific factor that help this scenario is that the first user equipment 10 is rather close to the relay node 14, thus having a much smaller path loss compared to the DL signal propagation from the radio base station 12 to the relay node 14.

Thus, the peak rate may be improved as the backhaul link, i.e. the first connection, and the access link, i.e. the second connection, may be used simultaneously. As an example, the relay node 14 identifies parts of the frequency spectrum where a transmission from the radio base station 12 in DL towards the relay node 14 has a good quality, e.g. the transmission may support a transmission rank higher than one. For these parts of the frequency spectrum, the relay node 14 examines which user equipments in its own cell that have a good channel quality, e.g. the user equipments that may support a transmission rank higher than one. The radio network node 14 may then configure the access link simultaneously with the backhaul link and allow these user equipments to transmit at the same time slot as the radio base station 12. If the first user equipment 10 and the radio base station 12 happen to transmit on the same frequency part, it would not be a problem to separate them as they were both carefully chosen based on channel conditions that may support concurrent transmissions from multiple sources. Transmission rank defines number of transmission streams to be used. If a user equipment has a transmission rank higher than one, the user equipment may transmit on two or more layers, e.g. transmit two, three or four streams over a single antenna or different antennas.

Figure 3:
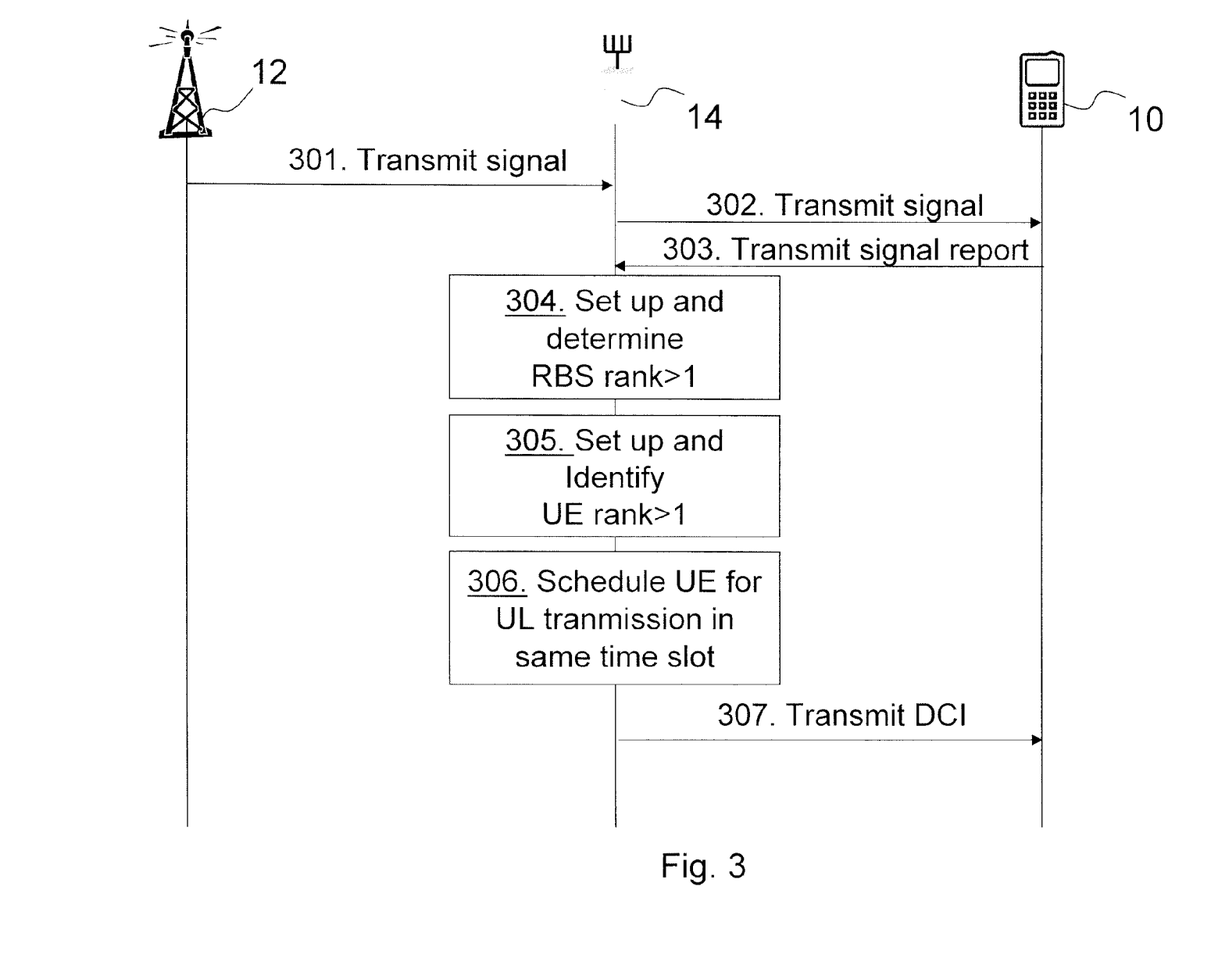
FIG. 3 is a schematic combined flowchart and signalling scheme in a radio communications network.

FIG. 3 is a schematic combined flowchart and signaling scheme of some further embodiments in a radio communications network.

Step 301. The radio base station 12 may transmit a signal to the relay node 14. The signal may comprise a first reference signal pattern and may further indicate configuration of a first connection to the radio base station 12. Such a configuration may comprise frequency used and similar. Step 301 corresponds to the step 201 in FIG. 2.

Step 302. The relay node 14 may in its turn transmit over a second connection a second reference signal pattern in a signal to the first user equipment 10. Step 302 corresponds to the step 202 in FIG. 2.

Step 303. The first user equipment 10 may transmit back to the relay node 14 a measurement report of a channel quality of the second connection. The measurement report is based on measurement on the received second reference signal pattern and may comprise a Channel State Information (CSI). The CSI may comprise Channel Quality Indicator (CQI), a Precoding Matrix Indicator (PMI), a Rank Indicator (RI) and/or similar. Step 303 corresponds to the step 203 in FIG. 2.

Step 304. The relay node 14 sets up the first connection to the radio base station 12 and may determine if transmission rank of the first connection is higher than one. For example, the relay node 14 may, based on the received first reference signal pattern comprised in a physical resource block over a number of sub carriers determine transmission rank of the first connection. However, when the radio base station 12 is in Multiple Input and Multiple Output (MIMO) transmission mode, the transmission rank used, i.e. the number of layers/streams it uses, in a DL transmission to the user equipments or the relays node 14 is based on a rank indicator reported by the user equipments or the relay node 14. Thus, in some embodiments the relay node 14 may 'fool' the radio base station 12 by sending a rank indicator that is lower than the rank indicator that the first connection between relay node 14 and the radio base station 12 supports, in order to have free antennas to allow a simultaneous transmission from the first user equipment 10 in the UL.

Thus, given that the relay node 14 may want to schedule an UL transmission for the first user equipment 10, the relay node 14 may decrease the measured, i.e. real, rank indicator value on the backhaul link and report this adjusted rank indicator to the radio base station instead. This way, the radio base station 12 will use less layers than it maximum can, allowing simultaneous UL and DL transmissions over the first part of the bandwidth. For example, the radio base station 12 may use two layers if reported rank is two but real transmission rank is three, and the third layer is used to simultaneously communicate with the user equipment 10.

Step 305. The relay node 14 then sets up the second connection over the first or the second part of the frequency spectrum. The relay node 14 may then identify that the second connection supports a transmission rank higher than a one layer transmission. For example, the relay node 14 may identify transmission rank supported based on the received channel state information from the first user equipment 10.

Step 306. The relay node 14 may then schedule UL transmission from the first user equipment 10 over the second connection, when the first connection supports a higher transmission rank than one and the second connection supports a higher transmission rank than one, at a time slot of a reference time configured by the radio communications network. The time slot is then used for transmitting data from the radio base station 12 to the relay node 14 and from the first user equipment 10 to the relay node 14. Similarly, the time slot may be used for transmitting data from the relay node 14 to the radio base station 12 and from the relay node 14 to the first user equipment 10.

The relay node 14 may select a user equipment out of a number of user equipments with a CSI that matches a CSI of a Physical Resource Block (PRB) received from the radio base station 12.

Step 307. The relay node 14 may then transmit configuration information to the first user equipment 10 such as scheduling grant information and similar indicating time slot to receive/transmit on.

When the relay node 14 schedules user equipments for UL transmissions in the relay cell 16, the relay node 14 determines that the user equipments will not interfere with the user equipments that the radio base station 12 is transmitting to in the DL. However, this is not expected to be a limitation as the user equipments served by the radio base station 12 are typically not close to the relay node 14, as otherwise these user equipments would have been served by the relay node 14. Furthermore, the transmission power of the first user equipment 10 is significantly less than that of the radio base station 12, so the interference created by the user equipments that the relay node 14 schedules for an UL transmission towards the user equipments served by the radio base station 12 during the DL is expected to be minimal or almost non-existent.

So based on both distance and difference in used transmit power, the interference created by the extra scheduled user equipments will be minimal. However, known interference coordination techniques may be used in order to limit the interference to the lowest possible value.

Embodiments herein targets radio communications networks that uses a TDD configuration since the user equipments have the capability to transmit and receive on the same frequency band, i.e. since the same frequency is used for both UL and DL.

During the DL phase, and if a backhaul link is configured, the relay node 14 is today not supposed to transmit to the first user equipment 10 in the relay cell 16, but only wait for a possible transmission from the radio base station 12. However, in the relay cell 16, many user equipments may have a good channel quality with the radio network node 14. Furthermore, it is assumed that the backhaul channel quality is good. By exploiting the Time Division Duplex (TDD) characteristics that the UL and DL transmissions occur on the same spectrum, the relay node 14 may schedule user equipments with good channel conditions to simultaneously transmit when the radio base station 12 is transmitting.

It should be noted that it could be so that the radio base station 12 would transmit on all PRBs, or only on some of them. This information is not readily available at the relay node 14 as it is decided per Transmission Time Interval (TTI). As such, link adaptation of the first user equipment 10 in the relay cell 16 transmitting in the UL while a backhaul link in the DL is configured could need to be performed robust enough, i.e. considering a worst case scenario of the radio base station 12 transmitting on these PRBs. Since the relay node 14 has the channel quality information of both the backhaul and access links, the relay node 14 may then perform link adaptation in a suitable way for the user equipment 10. For example, although the radio base station 12 has configured X PRBs for DL transmission, the radio base station 12 transmit on only Y of these X PRBs, where Y<X. However, the relay node 14 does not know readily whether there will be transmission on all of the X PRBs or only on Y of them. As such, the relay node 14 may 'assume' a worst case scenario and compute the link adaptation parameters of the UL transmission assuming that the radio base station 12 will simultaneously transmit in the DL. This is a worst case scenario because the DL transmission will be seen as an interference for the UL transmission, forcing the relay node 14 to choose robust aka defensive, values of the link adaptation parameters.

It would also for example be possible for the relay node 14 and the radio base station 12 to coordinate how many antennas will be utilized for the transmission from the radio base station 12 to the relay node 14 and vice versa.

In some embodiments, the relay node 14 may either obtain a link adaptation parameter from the radio base station 12 or even just measure the channel quality of the first connection and try to guess the outcome of a link adaptation operation at the radio base station 12. This is in case the relay node 14 does not want to wait for the radio base station 12 to send this information to the relay node 14. The relay node 14 may choose a Modulation and Coding Scheme (MCS) and a transmit power for the transmission to the first user equipment 10 based on the link adaptation measure or outcome, or simply based on the channel quality between the relay node 14 and the radio base station 12 on a specific resource allocation, and based on the channel quality between the relay node 14 and the first user equipment 10 on the same resource allocation.

In order to avoid interference, the relay node 14 may use beamforming or similar to direct the radio coverage.

Thus, the frequency spectrum is used in a more optimized manner as the communication between the relay node 14 and the first user equipment 10 is allowed to be performed simultaneously as communication between the relay node 14 and the radio base station 12.

Figure 4:
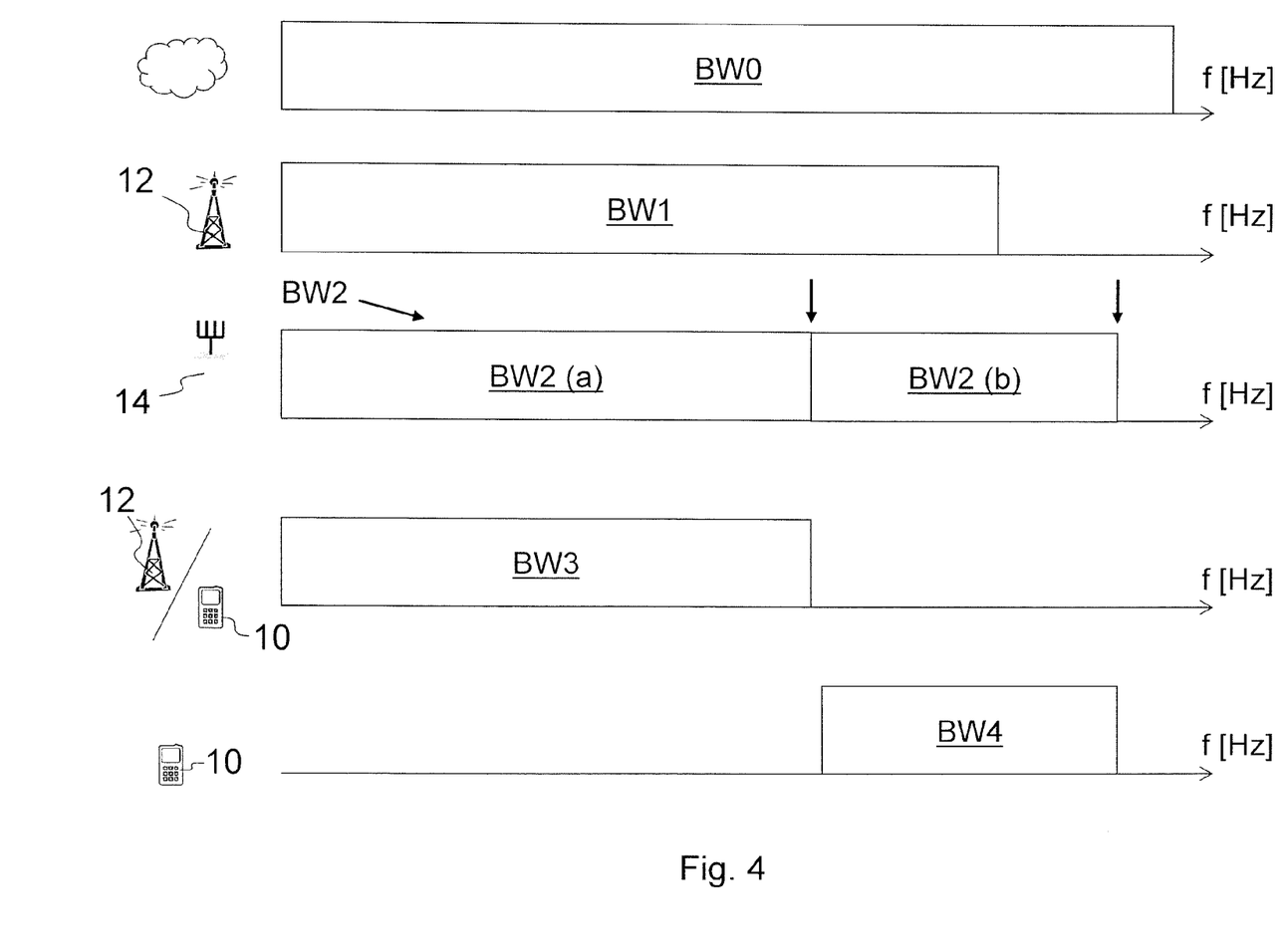
FIG. 4 is a block diagram depicting bandwidth utilization in a radio communications network.

FIG. 4 is a schematic block diagram depicting bandwidths used by the different nodes in the radio communications network.

An operator is allowed to use a total bandwidth BW0 due e.g. to technology restrictions, license agreement from the government, the bandwidth the operator bought etc. It may happen that processing at the radio base station 12 is not quick enough to be able to handle of the total bandwidth BW0 or the operator may just buy enough processing power to process a first bandwidth BW1, which may be smaller than the total bandwidth BW0. The radio network node 14 arranged for relaying communication may operate and process a second bandwidth BW2, which second bandwidth BW2 may be larger, equal or smaller than the first bandwidth BW1 and equal or smaller than the total bandwidth BW0 due to similar reason as stated above. The first bandwidth BW1 and/or the second bandwidth BW2 may be configured either dynamically or statically e.g. pre-planned. Furthermore, the radio base station 12 may configure a first part of the second bandwidth, also referred to as a first part of the second bandwidth BW2, denoted BW2(*a*) and corresponding to BW3, for possible communication between the radio base station 12 and the radio network node 14, either in UL or DL. As such, the second bandwidth BW2 may comprise a bandwidth not used for communication with the radio base station 12, a second part of the second bandwidth BW2, denoted BW2(*b*) and corresponding to BW4, which may be a non-configured bandwidth. Thus, the second part BW2(*b*) of the second bandwidth BW2 is the bandwidth available at the relay node 14 that will not be utilized to communicate with/to the radio base station 12 when a backhaul link is configured. Note that the arrows on the edges of BW2(*a*) and BW2(*b*) mean that BW2(*a*) is less than or equal to BW1, and the end of BW2 (*b*) may at most reach the end of BW0, but it could also be so that BW2<BW1.

The first part BW3 may be used for communication between the radio base station 12 and the radio network node 14, but may also be used for communication between the radio network node 14 and the first user equipment 10. The second part BW4 of the second bandwidth BW2 is only used for communication between the radio network node 14 and user equipments, such as the first user equipment 10, as illustrated in FIG. 4.

The radio network node 14 is enabled to communicate with the first user equipment 10 simultaneously as communicating with the radio base station 12 over the different bandwidths BW3 and BW4 or the same bandwidth BW3. On the second part BW4 of the second bandwidth BW2, the relay node 14 is able to freely schedule transmission to/from the first user equipment 10 when a backhaul link is configured to the radio base station 12. On the first part BW3 of the second bandwidth BW2, the relay node 14 may cheat the radio base station 12 with reduced number of a reported rank indicator. Thus, the relay node 14 is able to schedule the first user equipment 10 wherein the radio base station 12 is also configured to transmit or receive data.

It should be noted that in the FIG. 4, the first bandwidth BW1 and the second bandwidth BW2 all have a starting point and are contiguous. Of course this is just an illustration of a special case, and variation hereof may be used and implemented. In some embodiments highest priority to be utilized is the second part BW4 of the second bandwidth. If more frequency spectrum is needed, the first part BW3 may be used for user equipments where the relay node 14 makes sure it suitably accounts for UL Uu transmissions by choosing robust enough Modulation and Coding Scheme (MCS).

Figure 5:
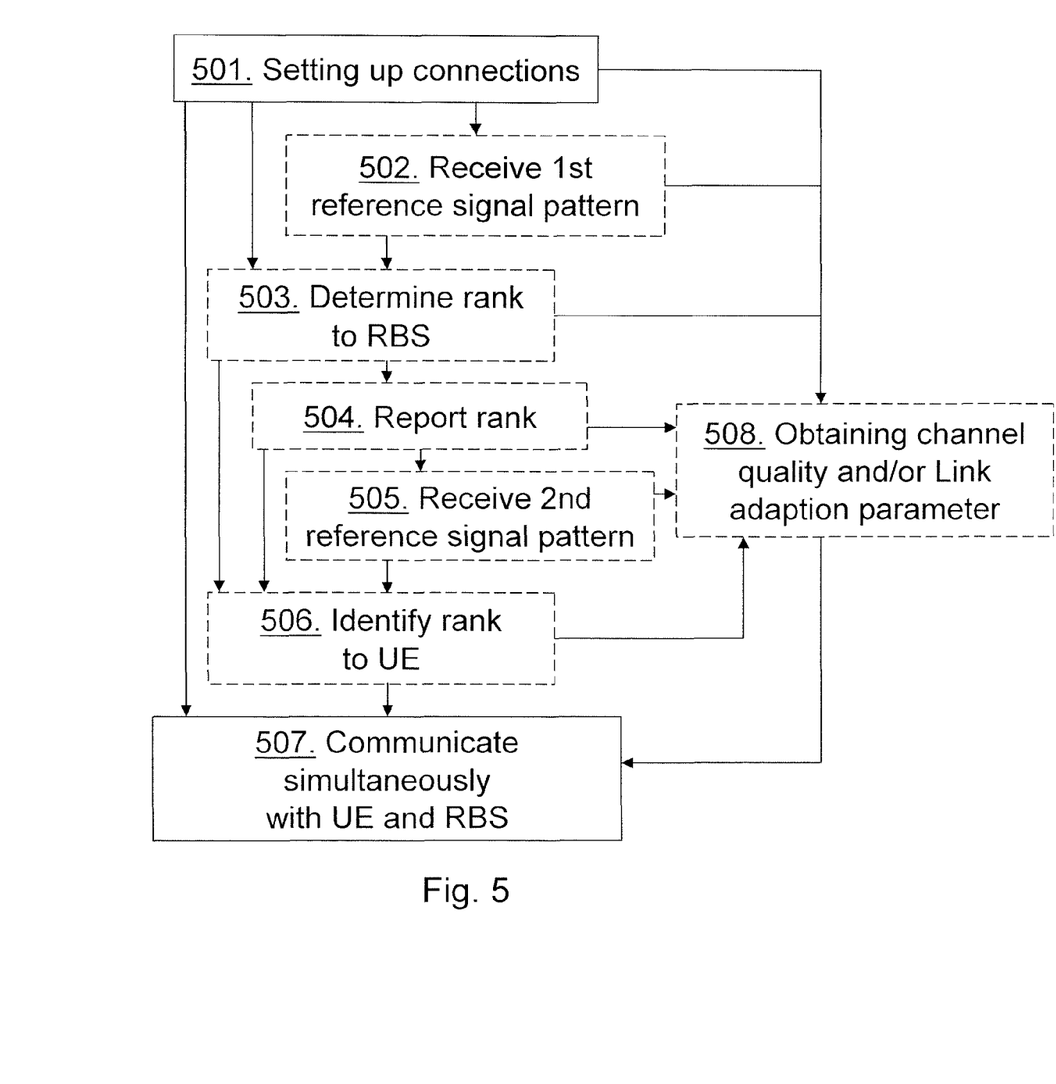
FIG. 5 is a schematic flowchart of a method in a radio network node.

The method steps in the radio network node, also referred to as relay node 14 in the figures, for communicating with the user equipment 10, also referred to herein as the first user equipment 10, according to some general embodiments will now be described with reference to a flowchart depicted in FIG. 5. The steps do not have to be taken in the order stated below, but may be taken in any suitable order. The radio network node 14 is to communicate with the user equipment 10 during a communication between the radio network node 14 and the radio base station 12 in the radio communications network. The radio network node 14, radio base station 12 and the user equipment 10 are comprised in the radio communications network. The radio network node 14 serves the user equipment 10 within a cell 16, also herein referred to as a relay cell 16, and is configured to communicate with the radio base station 12 and the user equipment 10 over a frequency spectrum in a time division duplexing configuration.

Step 501. The radio network node 14 sets up a first connection over a first part of the frequency spectrum to the radio base station 12, and a second connection to the user equipment 10 over the first or a second part of the frequency spectrum. The second part of the frequency spectrum is solely used for communication with user equipments within the cell 16. The radio base station may in some embodiments select the user equipment 10 from a number of user equipments served by the radio network node 14 based on a channel quality of respective user equipment.

Step 502. The radio network node 14 may in some embodiments, as indicated by the dashed line, receive a first reference signal pattern over the first connection. The first reference signal pattern is carried over a radio frequency of the first part from the radio base station 12.

Step 503. The radio network node 14 may in some embodiments, as indicated by the dashed line, determine that the first connection to the radio base station 12 supports a transmission rank higher than a one layer transmission.

The step of determining may comprise to determine from the first reference signal pattern that the first connection supports a transmission rank higher than a one layer transmission.

Step 504. The radio network node 14 may in some embodiments as indicated by the dashed line, report back to the radio base station 12 that the first connection supports a reported transmission rank, which reported transmission rank is lower than the determined transmission rank.

Thus, the relay node 14 may cheat the radio base station 12 with its Rank Indicator report to the radio base station 12. The relay node 14 may report a lower rank indicator than the real measured one in order to trick the radio base station 12 to send on fewer layers, making it possible for the user equipment 10 to transmit simultaneously in the UL on the same resources as the radio base station 12 transmits DL to the relay node 14.

Step 505. The radio network node 14 may in some embodiments as indicated by the dashed line, receive a channel state information over the second connection transmitted over the first or second part of the radio frequency spectrum from the user equipment 10.

Step 506. The radio network node 14 may in some embodiments as indicated by the dashed line, identify that the second connection to the user equipment 10 supports a transmission rank higher than a one layer transmission. The step of identifying that the user equipment 10 supports a transmission rank higher than a one layer transmission may be based on the channel state information.

Steps 502-506 may be seen as embodiments of the step of setting up connections 501.

Step 507. The radio network node 14 communicates simultaneously with the user equipment 10 and the radio base station 12 over respective connection in a time slot of a reference time configured by the radio communications network.

The step of communicating is performed at the same time slot, which time slot may then be used for simultaneously transmitting data to the radio base station 12 and the user equipment 10 or for simultaneously receiving data from the radio base station 12 and the user equipment 10.

The radio network node 14 may, in some embodiments, transmit a downlink control information to the user equipment 10 indicating which frequency subband of the frequency spectrum to use for transmission and/or for reception.

The radio network node 14 may in some embodiments utilize at least two antennas when operating on the first part of the frequency spectrum. A first antenna may be used for communicating with the radio base station 12 and a second antenna may be used for communicating with the user equipment 10.

Step 508. The radio network node 14 may in some embodiments as indicated by the dashed line, obtain a channel quality of the first connection and a channel quality of the second connection. Then the step of communicating may be performed also based on the obtained channel qualities of the respective connection; and may comprise choosing a modulation and coding scheme and a transmit power for the transmission to the user equipment 10 based on the channel qualities.

In some embodiments, the radio network node 14 obtains a link adaptation parameter, from the radio base station 12, on a specific resource of the first connection towards the radio base station 12. The radio network node 14 may also guess or determine the link adaptation parameter on the specific resource based on obtained channel qualities.

The radio network node 15 may then communicate by choosing a modulation and coding scheme and a transmit power for the transmission to the user equipment 10. The MCS and transmit power may be chosen based on the link adaptation parameter on the specific resource and on the channel quality between the radio network node 14 and the user equipment 10 on the same specific resource.

The radio network node 14 may in some embodiments beamform an antenna port towards the user equipment 10, or control the transmission power of the user equipment 10 to reduce interference towards the radio base station 12.

Thus, a method in the relay node 14 is provided for increasing the peak rate and throughput of the user equipment served by the relay node through allowing the user equipment in the cell 16 to transmit in the UL to the relay node 14 that is configured for a backhaul DL transmission from the radio base station 12. Alternatively, allowing the relay node 14 to transmit to the user equipment 10 in its own cell 16 in the DL while being configured for a backhaul UL transmission to the radio base station 12.

Embodiments herein increase the spectral efficiency due to a more optimal utilization of the spectrum, and increase the peak rates of the user equipment served by the radio network node 14 as the strict division is alleviated through allowing user equipments in the cell to always transmit/receive even if a backhaul link is configured. Also, embodiments herein provide less delay in the communication between radio network node 14 and the radio base station 12 as the backhaul link may now be more often configured, since the entire frequency spectrum may be utilized using embodiments herein, which are specifically more beneficial for Hybrid Automatic Repeat Request (HARQ) retransmissions and delay-sensitive data. As even when the backhaul link is configured, transmissions or retransmissions on the access link may be performed, not having to wait for the backhaul communication to finish. So the delay of the reported ACK and NACKS in HARQ advantages is reduced or minimized.

It should be noted that the gains achieved by the proposed method do not affect/decrease other the gains obtained from the usage of relay nodes.

Figure 6:
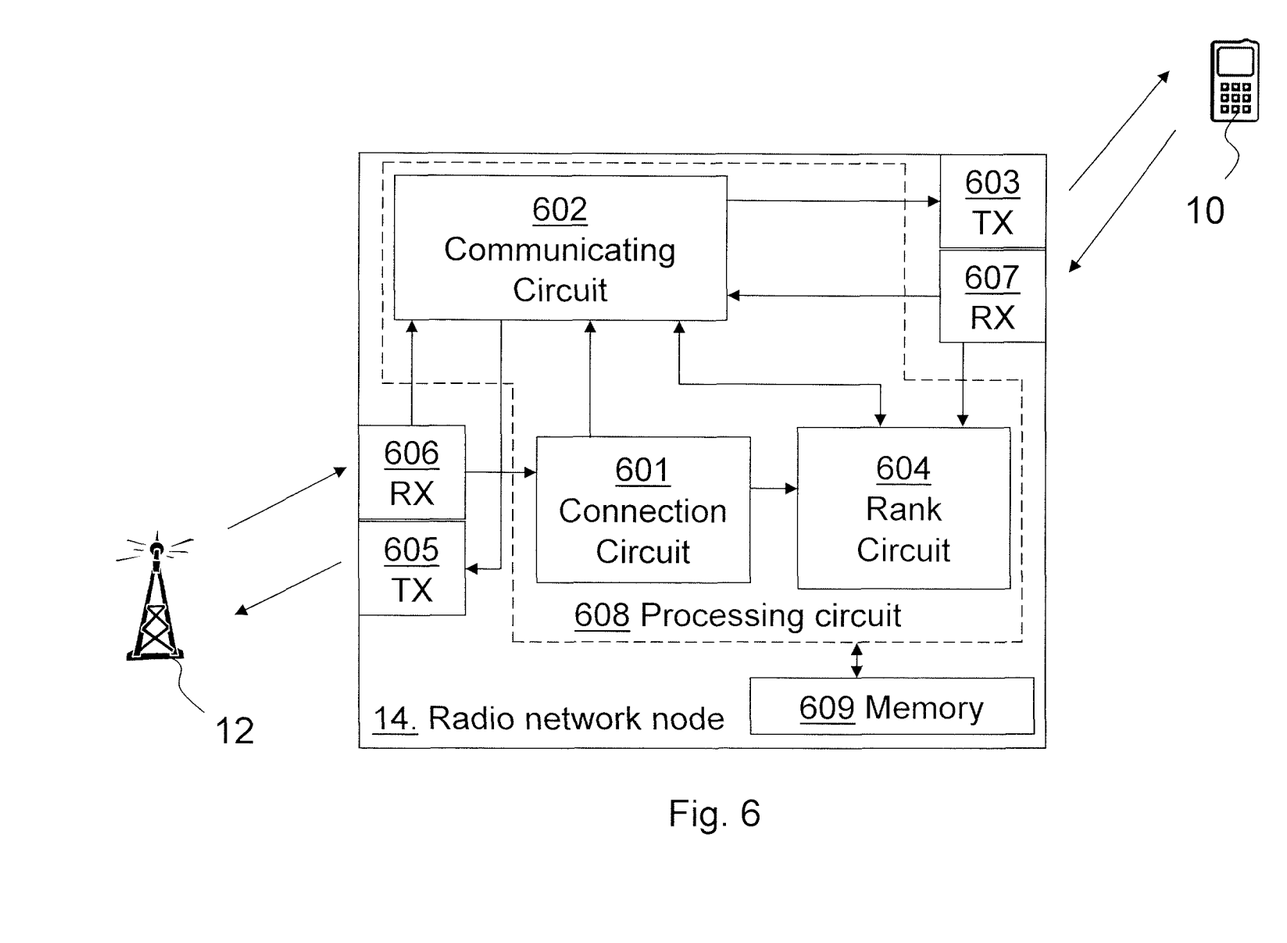
FIG. 6 is a block diagram depicting a radio network node.

FIG. 6 is a block diagram depicting the radio network node 14 in the radio communications network. The radio network node 14 communicates with a user equipment 10 during a communication between the radio network node 14 and a radio base station 12 in a radio communications network. The radio network node 14 is arranged to serve the user equipment 10 within a cell 16 and to communicate with the radio base station 12 and the user equipment 10 over a frequency spectrum in a time division duplexing configuration. The radio network node 14 comprises a connection circuit 601 configured to set up a first connection to the radio network node 14 over a first part of the frequency spectrum, and to set up a second connection over the first or a second part of the frequency spectrum. The second part of the frequency spectrum is solely used for communication with user equipments within the cell 16 of the radio network node 14. The radio network node 14 further comprises a communication circuit 602 configured to communicate simultaneously with the user equipment 10 and the radio base station 12 over respective connection in a time slot of a reference time configured by the radio communications network. The communication circuit 602 may in some embodiments be configured to transmit over a first transmitter 603 a downlink control information to the user equipment 10 indicating which frequency subband of the frequency spectrum to use for transmission and/or for reception. The communication circuit 602 may in some embodiments be configured to beamform an antenna port towards the user equipment 10, or to control the transmission power of the user equipment 10 to reduce interference towards the radio base station 12.

The connection circuit 601 may be configured to select the user equipment 10 from a number of user equipments served by the radio network node 14 based on a channel quality of respective user equipment.

The connection circuit 601 may in some embodiments be further configured to obtain a channel quality of the first connection and a channel quality of the second connection. The communication circuit 602 may then be configured to further perform communication also based on the obtained channel qualities of the respective connection; and to choose a modulation and coding scheme and a transmit power for the transmission to the user equipment 10 based on the channel qualities.

The connection circuit 601 may further be configured to obtain a link adaptation parameter, from the radio base station 12, on a specific resource of the first connection towards the radio base station 12. Alternatively, the connection circuit 601 may be configured to determine the link adaptation parameter on the specific resource based on obtained channel qualities. Then the communication circuit 602 may further be configured to choose a modulation and coding scheme and a transmit power for the transmission to the user equipment 10 based on the link adaptation parameter on the specific resource and on the channel quality between the radio network node 14 and the user equipment 10 on the same specific resource.

The radio network node 14 may in some embodiments comprise a rank circuit 604 configured to determine that the first connection to the radio base station 12 supports a transmission rank higher than a one layer transmission. The rank circuit 604 may further be configured to identify that the second connection to the user equipment 10 supports a transmission rank higher than a one layer transmission. The communication circuit 602 may then in some embodiments be further configured to perform the communication at the time slot, which time slot is then used for simultaneously transmitting data to the radio base station 12, over a second transmitter 605, and the user equipment 10, over the first transmitter 603, or simultaneously receiving data from the radio base station 12, over a first receiver 606, and the user equipment 10, over a second receiver 607.

In some embodiments the connection circuit 601 is further configured to report back to the radio base station 12 that the first connection supports a reported transmission rank, which reported transmission rank is lower than the determined transmission rank.

The radio network node 14 may in some embodiments comprise the first receiver 606 configured to receive a first reference signal pattern over the first connection, which first reference signal pattern is carried over a radio frequency of the first part from the radio base station 12. Then the rank circuit 604 may be configured to determine from the first reference signal pattern that the first connection supports a transmission rank higher than a one layer transmission. Furthermore, the radio network node 14 may further comprise the second receiver 607 configured to receive a channel state information over the second connection transmitted over the first or second part of the radio frequency spectrum from the user equipment 10. Then the rank circuit 602 may be configured to identify that the user equipment 10 supports a transmission rank higher than a one layer transmission based on the channel state information.

The radio network node 14 may be configured with at least two antennas to be utilized when operating on the first part of the frequency spectrum. The first receiver 606 and the second receiver 607 may be comprised in a single or multiple receiving arrangement, as well as the first transmitter 603 and the second transmitter 605 may be comprised in a single or multiple transmitting arrangements.

The radio network node 14 may comprise a relay node in the radio communications network.

The embodiments herein for communicating with the user equipment 10 may be implemented through one or more processors, such as a processing circuit 608 in the radio network node 14 depicted in FIG. 6, together with computer program code for performing the functions and/or method steps of the embodiments herein. The program code mentioned above may also be provided as a computer program product, for instance in the form of a data carrier carrying computer program code for performing the present solution when being loaded into the radio network node 14. One such carrier may be in the form of a CD ROM disc. It is however feasible with other data carriers such as a memory stick. The computer program code may furthermore be provided as pure program code on a server and downloaded to the radio network node 14.

The radio network node 14 may further comprise a memory 609 comprising one or more memory units. The memory is arranged to be used to store data such as, link adaptation parameters, channel qualities, frequency spectrums, and applications to perform the methods herein when being executed in the radio network node 14.

Note that in this disclosure focus is on the downlink, but a corresponding method may be used for uplink as well.

Furthermore, throughout this disclosure the radio base station 12 may configure one or two relay nodes for backhaul during the same transmission interval: this is for illustration purpose only. It could be so that more relay nodes are configured during the same transmission interval, thus utilizing even less spectrum at each relay node, and making the gains of the proposed method even bigger.

In the drawings and specification, there have been disclosed exemplary embodiments herein. However, many variations and modifications can be made to these embodiments without substantially departing from the principles of the embodiments.

Accordingly, although specific terms are employed, they are used in a generic and descriptive sense only and not for purposes of limitation, the scope of the invention being defined by the following claims.

The invention claimed is:

1. A method in a radio network node for communicating with a user equipment during a communication between the radio network node and a radio base station in a radio communications network, wherein the radio network node, the radio base station and the user equipment are comprised in the radio communications network, the radio network node serves the user equipment within a cell and is configured to communicate with the radio base station and the user equipment over a frequency spectrum in a time division duplexing configuration, the method comprising:

setting up a first connection over a first part of the frequency spectrum to the radio base station, and a second connection to the user equipment over the first or a second part of the frequency spectrum, wherein the second part of the frequency spectrum is solely used for communication with user equipments within the cell;

determining that the first connection to the radio base station supports a transmission rank higher than a one layer transmission;

reporting back to the radio base station that the first connection supports a reported transmission rank, wherein the reported transmission rank is lower than the determined transmission rank;

identifying that the second connection to the user equipment supports a transmission rank higher than a one layer transmission; and     communicating simultaneously with the user equipment and the radio base station over respective connection in a time slot of a reference time configured by the radio communications network, wherein the communicating is performed at the time slot, wherein the time slot is then used for simultaneously transmitting data to the radio base station and the user equipment or simultaneously receiving data from the radio base station and the user equipment.

2. A method according to claim 1, further comprising obtaining a channel quality of the first connection and a channel quality of the second connection, and
wherein the communicating is performed also based on the obtained channel qualities of the respective connection; and
wherein the communicating comprises choosing a modulation and coding scheme and a transmit power for the transmission to the user equipment based on the channel qualities.

3. The method according to claim 2, further comprising obtaining a link adaptation parameter, from the radio base station, on a specific resource of the first connection towards the radio base station or determining the link adaptation parameter on the specific resource based on obtained channel qualities; and
wherein the step of communicating comprises choosing a modulation and coding scheme and a transmit power for the transmission to the user equipment based on the link adaptation parameter on the specific resource and on the channel quality between the radio network node and the user equipment on the same specific resource.

4. The method according to claim 1, wherein the step of communicating comprises to transmit a downlink control information to the user equipment indicating which frequency subband of the frequency spectrum to use for transmission and/or for reception.

5. The method according to claim 1, and wherein the step of communicating further comprises beamforming an antenna port towards the user equipment, or controlling the transmission power of the user equipment to reduce interference towards the radio base station.

6. The method according to claim 1, wherein the step of setting up a second connection further comprises selecting the user equipment from a number of user equipments served by the radio network node based on a channel quality of respective user equipment.

7. The method according to claim 1, wherein the radio network node utilizes at least two antennas when operating on the first part of the frequency spectrum.

8. A radio network node for communicating with a user equipment during a communication between the radio network node and a radio base station in a radio communications network, wherein the radio network node is arranged to serve the user equipment within a cell and to communicate with the radio base station and the user equipment over a frequency spectrum in a time division duplexing configuration, and the radio network node comprises:
a connection circuit configured to set up a first connection to the radio network node over a first part of the frequency spectrum, and a second connection over the first or a second part of the frequency spectrum and wherein the second part of the frequency spectrum is solely used for communication with user equipments within the cell of the radio network node;
a rank circuit configured to determine that the first connection to the radio base station supports a transmission rank higher than a one layer transmission, and to identify that the second connection to the user equipment supports a transmission rank higher than a one layer transmission;
wherein the connection circuit is further configured to report back to the radio base station that the first connection supports a reported transmission rank, wherein the reported transmission rank is lower than the determined transmission rank; and
a communication circuit configured to communicate simultaneously with the user equipment and the radio base station over respective connection in a time slot of a reference time configured by the radio communications network, wherein the communication circuit is further configured to perform the communication at the time slot, wherein the time slot is then used for simultaneously transmitting data to the radio base station and the user equipment or simultaneously receiving data from the radio base station and the user equipment.

9. The radio network node according to claim 8,
wherein the connection circuit is further configured to obtain a channel quality of the first connection and a channel quality of the second connection, and
wherein the communication circuit is further configured to perform communication also based on the obtained channel qualities of the respective connection, and to choose a modulation and coding scheme and a transmit power for the transmission to the user equipment based on the channel qualities.

10. The radio network node according to claim 9,
wherein the connection circuit is further configured to obtain a link adaptation parameter, from the radio base station, on a specific resource of the first connection towards the radio base station or to determine the link adaptation parameter on the specific resource based on obtained channel qualities; and
wherein the communication circuit is further configured to choose a modulation and coding scheme and a transmit power for the transmission to the user equipment based on the link adaptation parameter on the specific resource and on the channel quality between the radio network node and the user equipment on the same specific resource.

11. The radio network node according to claim 8, wherein the communication circuit is configured to transmit a downlink control information to the user equipment indicating which frequency subband of the frequency spectrum to use for transmission and/or for reception.

12. The radio network node according to claim 8, wherein the communication circuit is configured to beamform an antenna port towards the user equipment, or to control the transmission power of the user equipment to reduce interference towards the radio base station.

13. The radio network node according to claim 8, wherein the connection circuit is further configured to select the user equipment from a number of user equipments served by the radio network node based on a channel quality of respective user equipment.

14. The radio network node according to claim 8, wherein the radio network node is configured with at least two antennas to be utilized when operating on the first part of the frequency spectrum.

15. The radio network node according to claim 8, wherein the radio network node comprises a relay node in the radio communications network.

* * * * *

UNITED STATES PATENT AND TRADEMARK OFFICE
CERTIFICATE OF CORRECTION

PATENT NO. : 9,154,250 B2
APPLICATION NO. : 13/985684
DATED : October 6, 2015
INVENTOR(S) : Manssour Page 1 of 1

It is certified that error appears in the above-identified patent and that said Letters Patent is hereby corrected as shown below:

In the Drawings

In Fig. 3, Sheet 3 of 6, in Box "306", in Line 2, delete "tranmission" and insert -- transmission --, therefor.

In the Specification

In Column 11, Lines 3-8, delete "Indicator report........node 14." and insert the same at Line 2, after "Rank", as a continuation paragraph.

In Column 11, Line 59, delete "radio network node 15" and insert -- radio network node 14 --, therefor.

In Column 13, Line 52, delete "rank circuit 602" and insert -- rank circuit 604 --, therefor.

In the Claims

In Column 15, Line 6, in Claim 2, delete "A" and insert -- The --, therefor.

Signed and Sealed this
Twenty-eighth Day of June, 2016

Michelle K. Lee
*Director of the United States Patent and Trademark Office*